United States Patent Office 3,514,576
Patented May 26, 1970

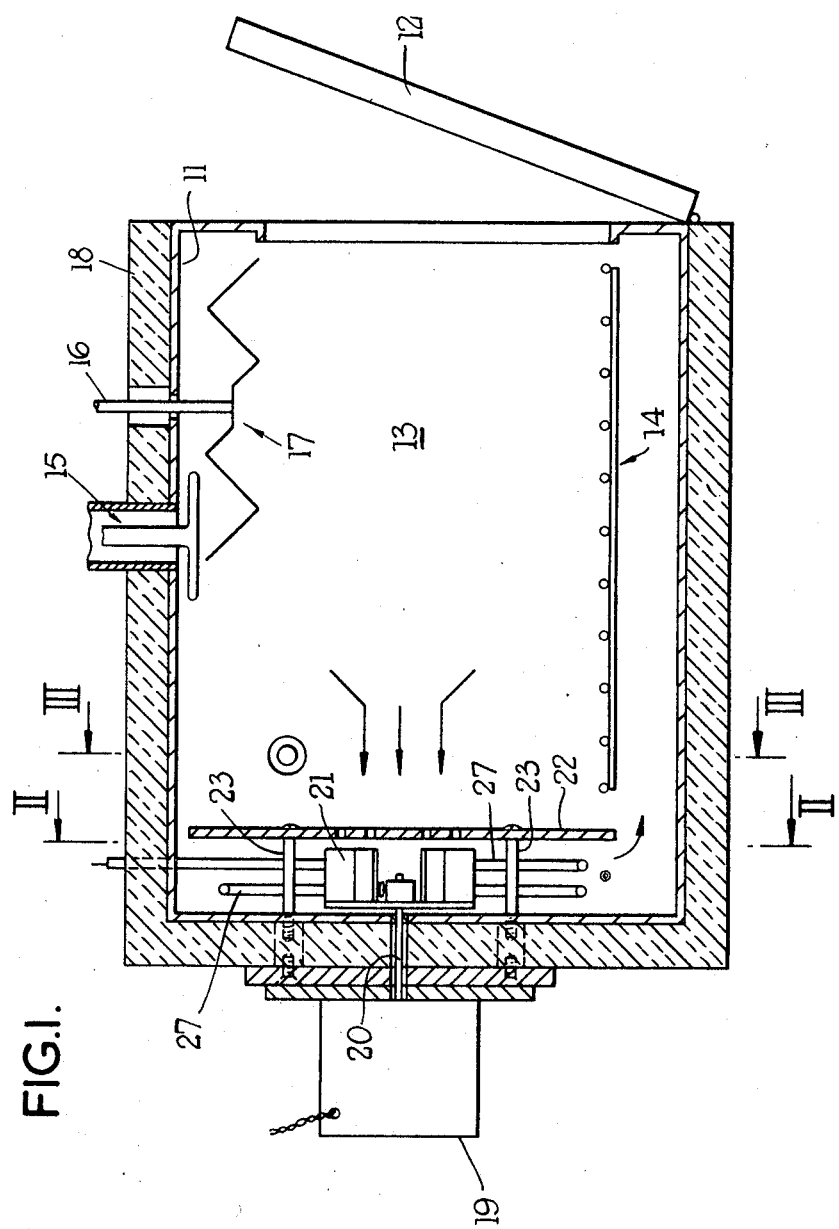

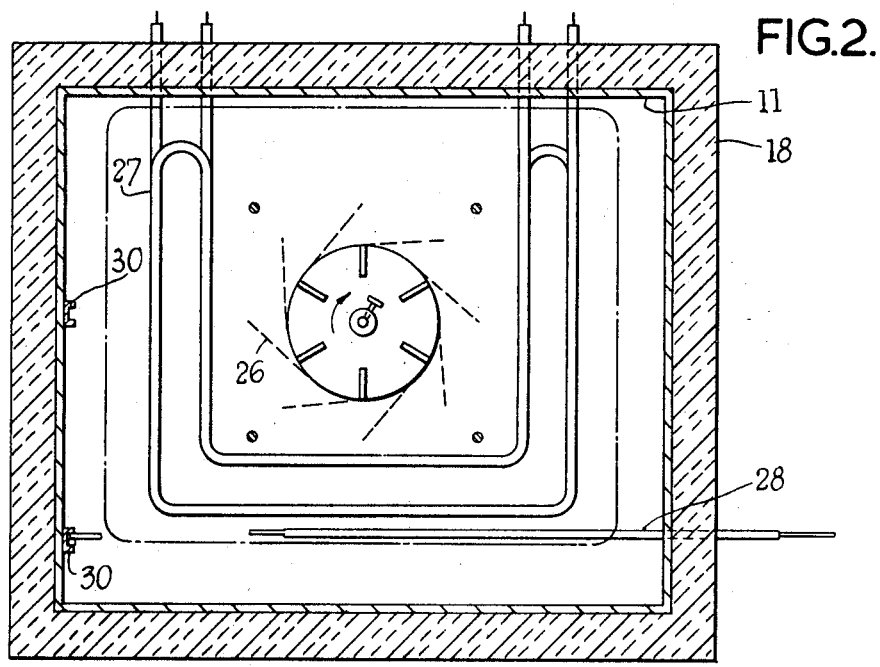
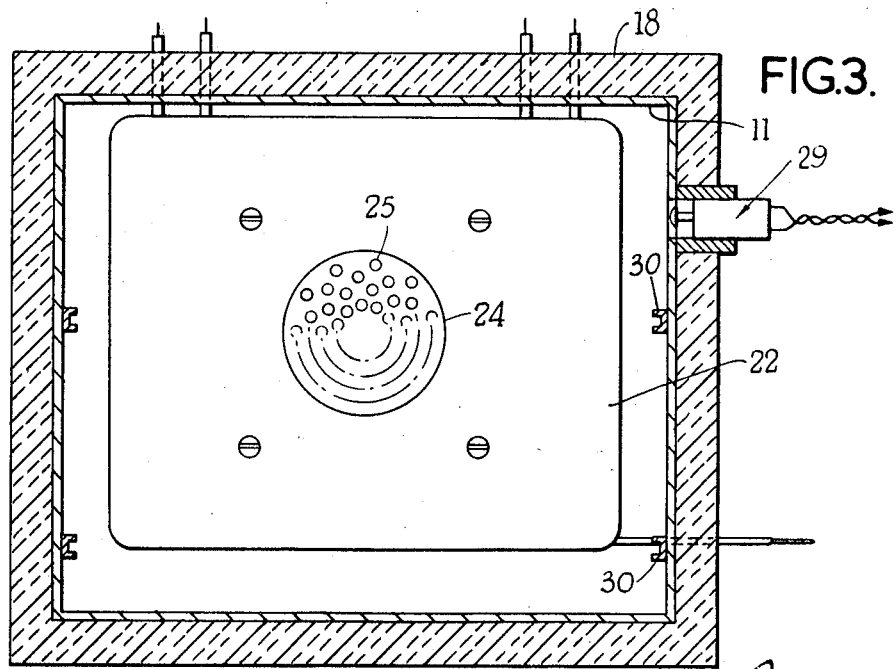

3,514,576
COMBINED MICROWAVE AND HOT AIR OVEN
Kenneth Hilton, Crawley, and Ronald J. W. Constable, Worthing, England, assignors to Hirst (Microwave Heating) Limited, Crawley, England, a British company
Filed June 24, 1968, Ser. No. 739,488
Int. Cl. F27d 11/00
U.S. Cl. 219—400                                    8 Claims

ABSTRACT OF THE DISCLOSURE

A combined microwave and hot air oven comprising a closed metal cavity, means for supplying microwave energy to the cavity and means for heating and circulating the air inside the cavity.

---

Ovens are known which comprise an enclosed cavity to which microwave energy is supplied to be absorbed by material placed in the cavity, thereby heating such material. One disadvantage of such microwave ovens, when used for cooking food, is that they do not "brown" the surface of the food, which therefore may look and taste relatively unappetising by comparison with food cooked in ovens of more traditional type. Another disadvantage of microwave ovens is that, because of the widely different dielectric constants and loss factors of ice and water, the heating of frozen foods takes place unevenly due to the preferential absorption of the microwave energy by the water.

Another known type of oven comprises an enclosed cavity through which air is circulated by a fan, the air being withdrawn from the cavity and then being heated before being returned thereto. Ovens of this kind have the disadvantages that they take almost as long to cook a small amount of food as they do to cook the maximum amount which could be accommodated in the oven. By contrast, the cooking time in a microwave oven is almost proportional to the amount of food in the oven, the cooking times for a fully charged microwave oven and a fully charged re-circulating air oven of equal heating capacity being similar. On the other hand, a re-circulating air oven, which heats the food by thermal conduction through its surface, yields cooked food which is conventionally oven-browned.

It is an object of the present invention to provide an oven which shows advantages of both the microwave oven and the re-circulating air oven.

According to the present invention there is provided an oven comprising an electrically conductive cavity provided with a door, means operable for supplying microwave energy to said cavity and heating means operable for heating and circulating the air inside the cavity.

An embodiment of an oven according to the invention is described below with reference to the accompanying drawings, in which:

FIG. 1 is a vertical sectional view through an oven according to the invention, and FIGS. 2 and 3 are vertical sectional views taken on the lines II—II and III—III respectively of FIG. 1.

As shown in the drawings the illustrated oven comprises a generally rectangular metal housing 11 preferably of stainless steel which, with a door 12 hingedly connected thereto, encloses a cavity 13 near the bottom of which is disposed a shelf 14 of the wire grid type, which is permissible with R.F. operation provided that the grid spacing is optimised for low reflection with even heat distribution with the mode stirrer. Alternatively the shelf 14 may be of a material, such as toughened glass, which is heat resisting and has a low loss factor for microwaves. Projecting through an aperture in the upper part of the housing 11 is an R.F. coupling device 15, of known kind, coupling the cavity 13 to microwave generator means of the oven, this generator means not being illustrated in the drawings but being of known kind in microwave ovens, suitably rated at 2 kw. (R.F.), 4.8 kw. mains supply. Also projecting into the cavity 13 through an aperture in the upper part of the housing 11 is a rotatable shaft 16 of a "mode stirrer" 17 which is also of known kind.

A layer 18 of thermally insulating lagging surrounds the housing 11. A motor 19 is mounted on top of this layer 18 at the rear of the housing 11, having a shaft 20 which projects through an aperture in the lagging 18 and the housing 11 and on which an impeller fan 21 is mounted. A cover plate 22, of stainless steel for example, is mounted in front of the fan 21 by means of support spacers 23. The central portion 24 of the plate 22 directly adjacent the fan 21 is formed with perforations 25.

It will be apparent that when the motor 19 rotates the fan 21 air from the cavity 13 is drawn through the perforations 25, discharged centrifugally from the fan 21, and returns round the sides of the plate 22 to the cavity 13. Stationary vanes 26 secured on the rear of the plate 22 assist in guiding the air expelled from the fan 21. Stationarily mounted in the air flow from the fan 21 are two metal-sheathed electric heater elements 27, suitably each of 1.5 kw. output, each connected to a heating current supply (not shown). The heating current supply is preferably of known kind which includes thermostatic control variable between, say, 150° F. and 550° F.; and a thermostat temperature-sensing element 28 for effecting such control is disposed in the path of air expelled from the fan 21 past the heater elements 27.

An adjustable no-load detector 29 of known type is mounted in the wall of the cavity 13 and is arranged to operate to switch off the R.F. supply when insufficient load is present in the cavity.

Shelf supports 30 are secured to the side walls of the cavity. In the drawings two supports are shown to enable a double stacking arrangement when the oven is used solely as a hot air oven. When the microwave heating is in operation a shelf 14 is mounted on the lower of the supports 30 only.

Preferably, the above-described oven can be used either as a simple microwave oven (by using the microwave generator but keeping the heater elements 21 and motor 19 switched off) or as a simple re-circulating air oven by switching on the heater elements and motor 19 but not the microwave generator. It is capable, however, of heating material placed in the cavity 13 by means, simultaneously, of both microwave energy supplied to the cavity through the coupling device 15 and air circulation and heating by means of the fan 21 and heating elements 27. When the microwave generator means and the air circulating means are made operative simultaneously, a number of advantages are obtained, including:

(a) Substantially uniform air temperature throughout the cavity 13, whereby all food surfaces therein (even if a number of food portions are stacked, on a suitable frame for example) are subjected to the same air temperature.

(b) Advantageous heating of small amounts of frozen food, since the relatively uniform heating effect of the air is combined with the speed of microwave heating.

(c) Relatively small moisture loss from the food, due to the use of re-circulating air.

(d) Little or no condensation of moisture on the interior walls, due to the use of heated air, whereby no extraction fan is required.

(e) Short warm-up time of the air within the cavity.

It will be appreciated that although the oven described above is a batch-type oven, the invention contemplates the provision of a conveyorised continuous-process oven and that according to the invention such ovens also may be provided with both microwave and recirculating-air heating means, operable simultaneously. Furthermore, either a batch-type or a continuous-process type oven according to the invention may, if it is desired to provide for control of air humidity within it, incorporate means for partial air replacement, in known manner.

As an alternative to the arrangement described above, the air heating elements 27 and the circulating fan 21 may be mounted behind the rear wall of the cavity 13 and arranged to supply heated air to the cavity by way of a series of apertures formed in the cavity wall.

What is claimed is:
1. An oven for heating and cooking food comprising:
   (a) electrically conductive wall means defining an enclosed zone including food support means for receiving said food;
   (b) generator means operable for supplying microwave heating energy into said zone;
   (c) impelling means for recirculating air in said zone; and
   (d) means for electrically heating said air to a temperature at which the air is capable of cooking said food;
whereby food in said zone exposed simultaneously to said microwave heating energy and said heated recirculated air may be quickly and uniformly prepared palatable for consumption.

2. The oven of claim 1 wherein said impelling means are fan means and said zone includes plate means disposed in spaced relation with and adjacent to one of said wall means and wherein said fan means and said heating means are disposed between said plate means and said wall means.

3. The oven of claim 2 wherein said plate means includes apertures whereby air may be drawn through said apertures and is circulated around the peripheral portions of said plate means.

4. The oven of claim 3, including vane means mounted behind said plate means to guide said air towards said peripheral portions of said plate means.

5. The oven of claim 2, wherein said plate means is disposed substantially parallel to one of said wall means which is vertically disposed and wherein door means are disposed in one of said wall means opposite said plate means.

6. The oven of claim 1, wherein heat insulating means surrounds said wall means, and wherein said wall means and said insulating means are formed with an aperture, and wherein said microwave generating means comprises microwave coupling means disposed in said aperture whereby generated microwaves are fed into said zone.

7. The oven of claim 1, wherein said heating means is capable of heating said air to a temperature between 150° F. and 550° F.

8. The oven of claim 1, wherein said food support means comprises a metallic grid having grid spacings optimized for low reflection of said microwaves, said metallic grid being disposed for supporting food at a position spaced from said wall means.

References Cited
UNITED STATES PATENTS

| | | | |
|---|---|---|---|
| Re. 24,296 | 3/1957 | Stewart | 219—410 |
| 2,221,595 | 11/1940 | Lockwood | 219—400 |
| 2,408,331 | 9/1946 | Mills | 219—400 |
| 2,864,932 | 12/1958 | Forrer | 219—400 X |
| 3,249,741 | 5/1966 | Mills | 219—411 X |
| 3,261,343 | 7/1966 | Tibell | 126—21 |
| 3,304,406 | 2/1967 | King | 219—411 |

VOLODYMYR Y. MAYEWSKY, Primary Examiner

U.S. Cl. X.R.

219—411

UNITED STATES PATENT OFFICE
CERTIFICATE OF CORRECTION

Patent No. 3,514,576     Dated May 26, 1970

Inventor(s) Kenneth Hilton and Ronald J. W. Constable

It is certified that error appears in the above-identified patent and that said Letters Patent are hereby corrected as shown below:

In column 1 prior to "Abstract of the Disclosure" insert -

Claims priority, application Great Britain, June 28, 1967, 29951/67.

Signed and sealed this 6th day of April 1971.

(SEAL)
Attest:

EDWARD M.FLETCHER,JR.          WILLIAM E. SCHUYLER, JR.
Attesting Officer              Commissioner of Patents